July 11, 1944.   D. MacLEAN ET AL   2,353,172
SHOCKING HARVESTER
Filed June 13, 1940   12 Sheets-Sheet 8
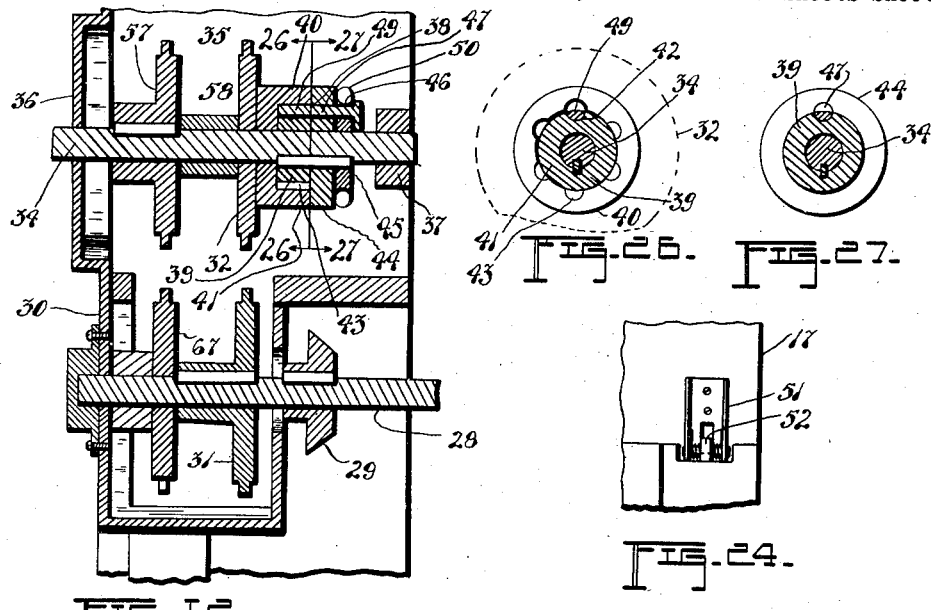
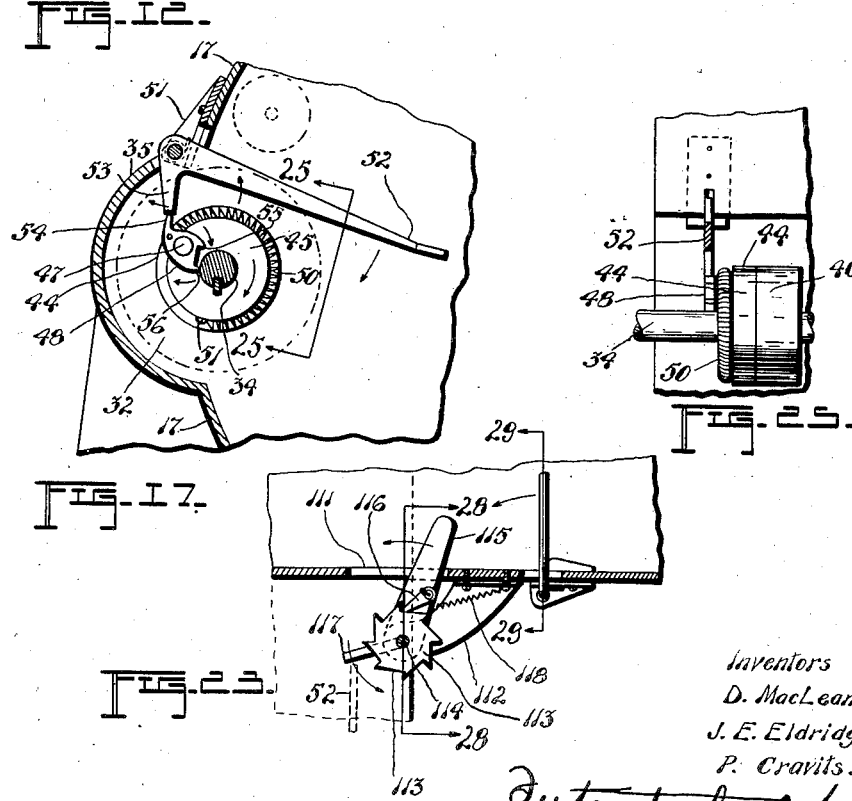
Inventors
D. MacLean,
J. E. Eldridge,
P. Cravits Jr.
Fetherstonhaugh & Co
Atty's.

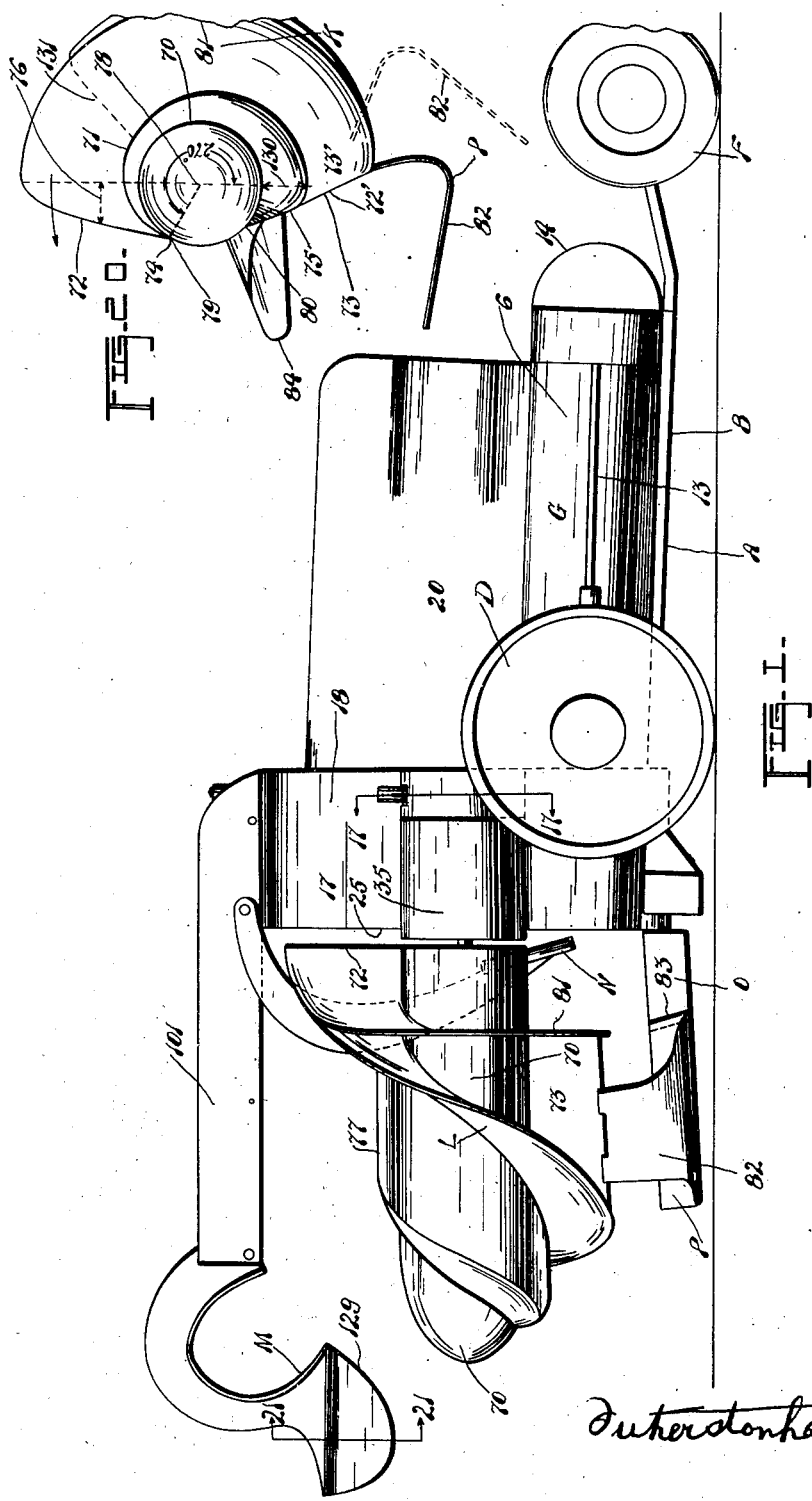

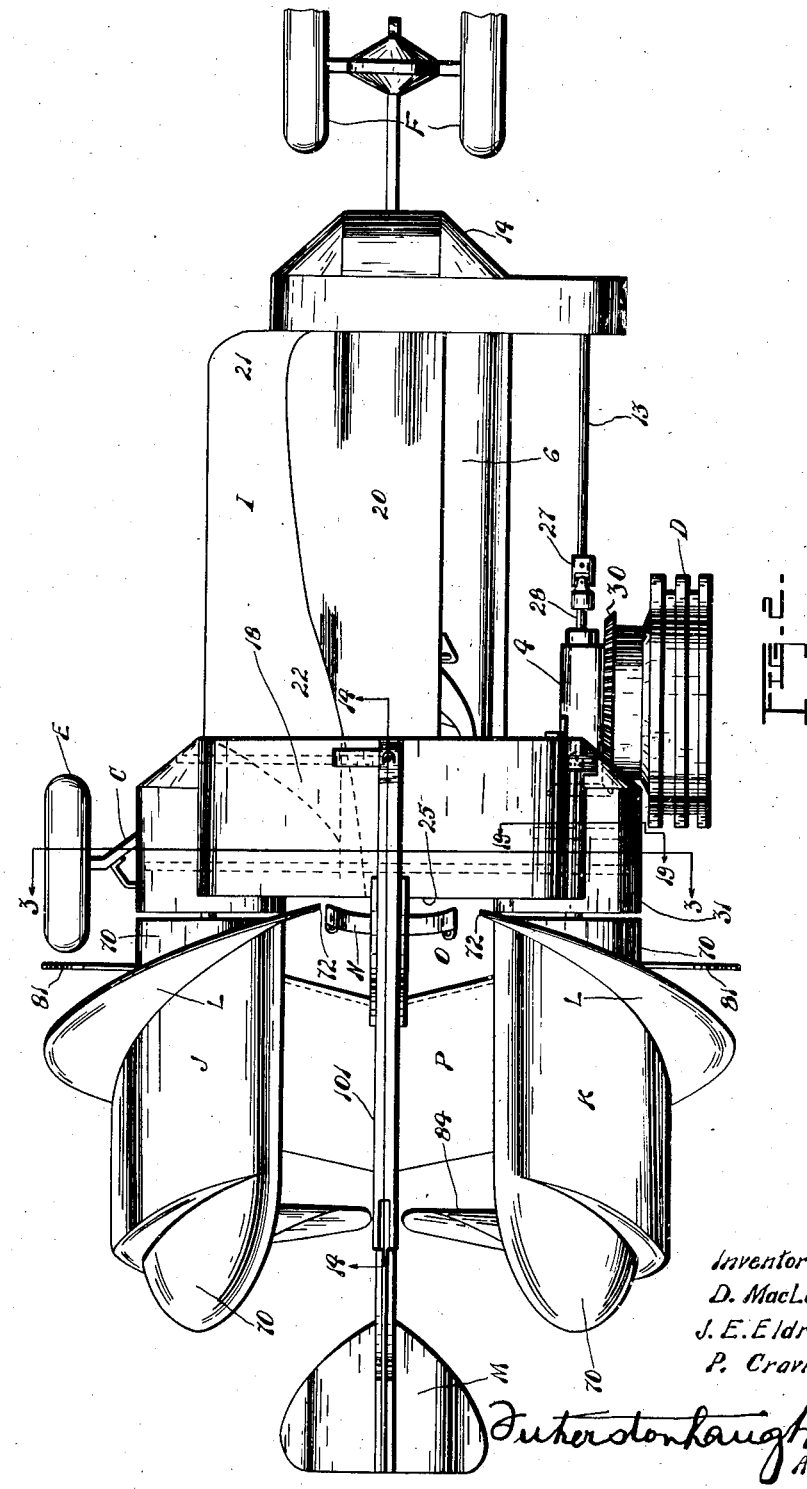

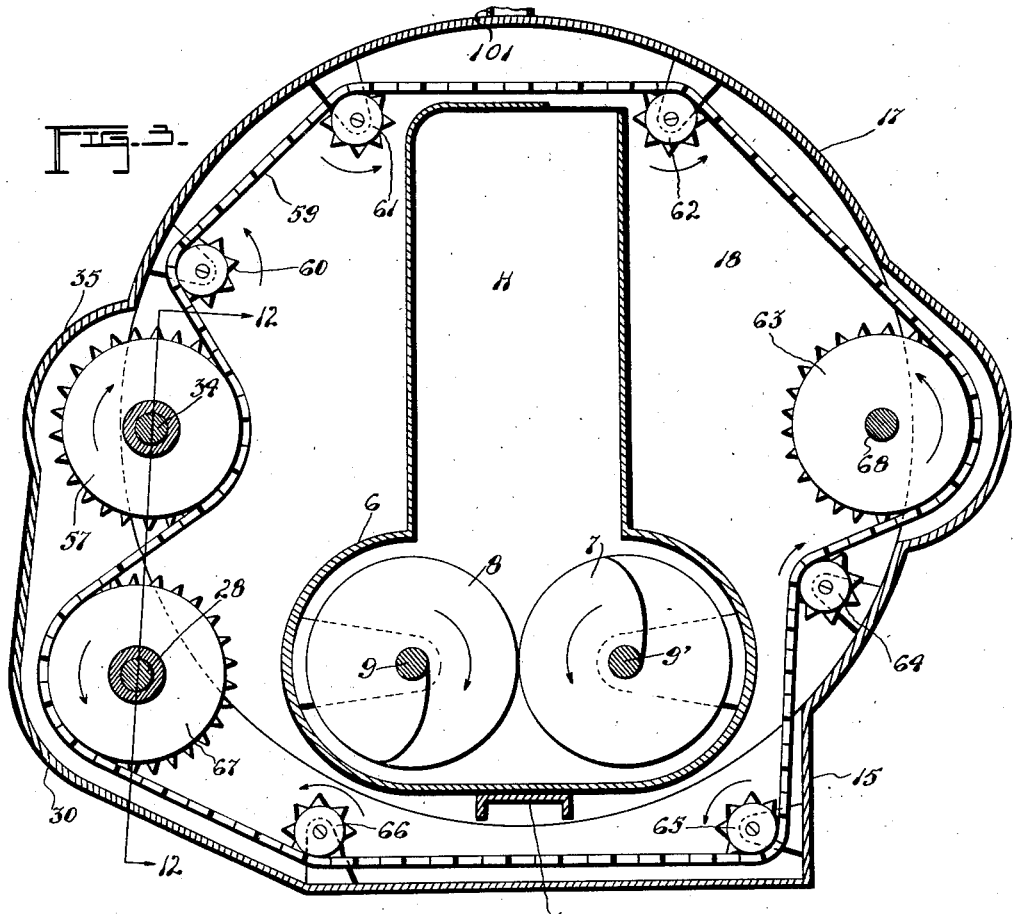

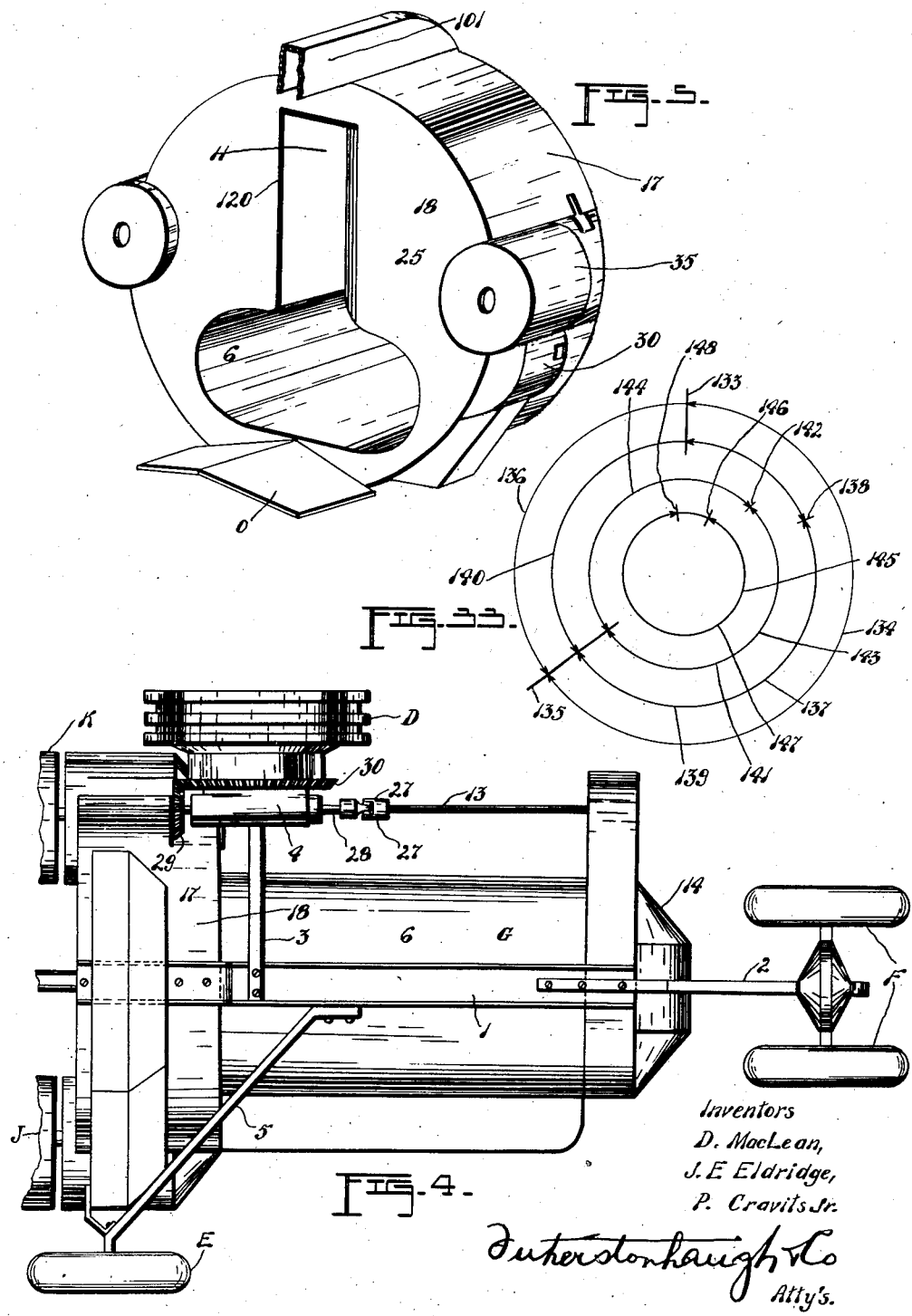

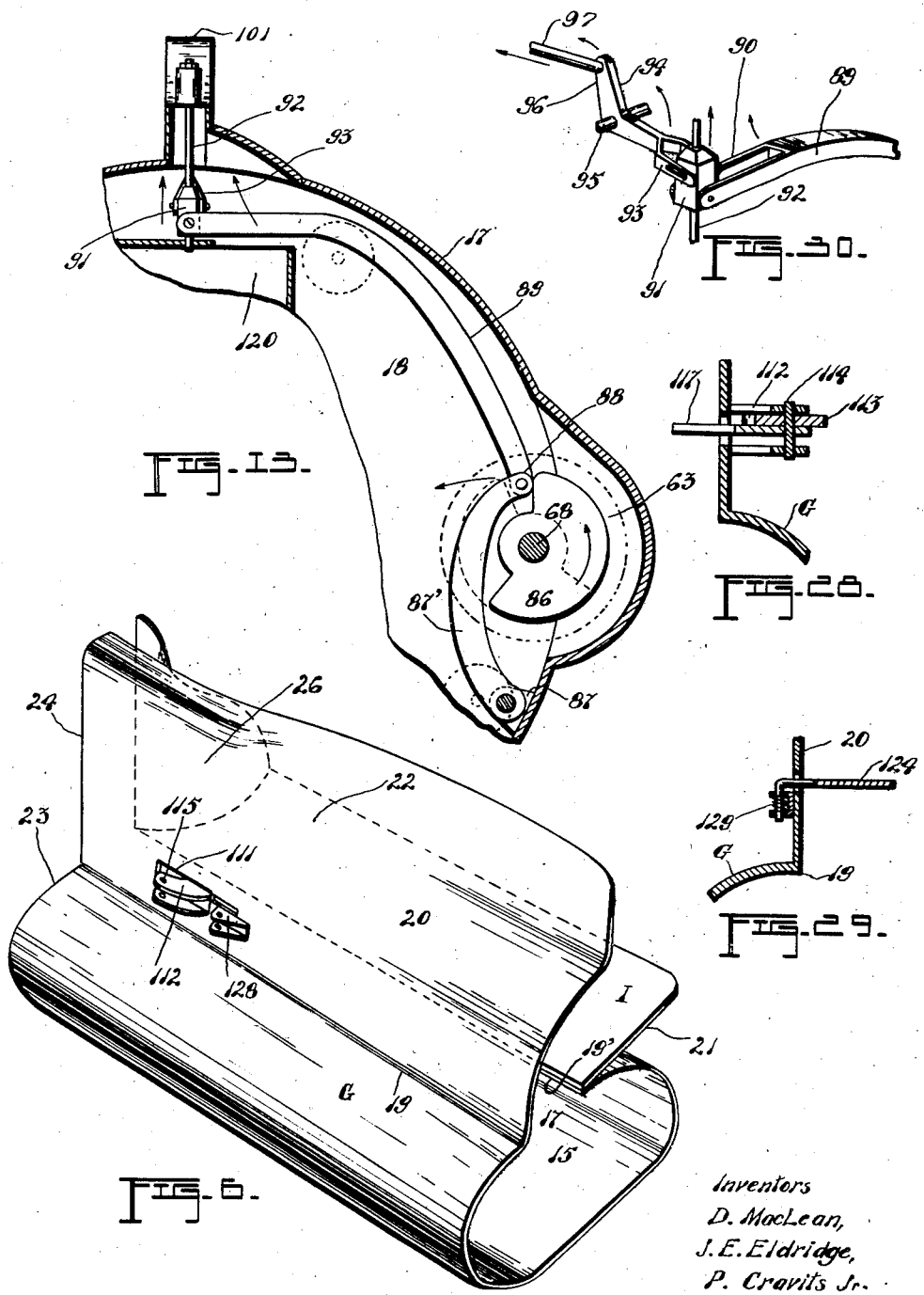

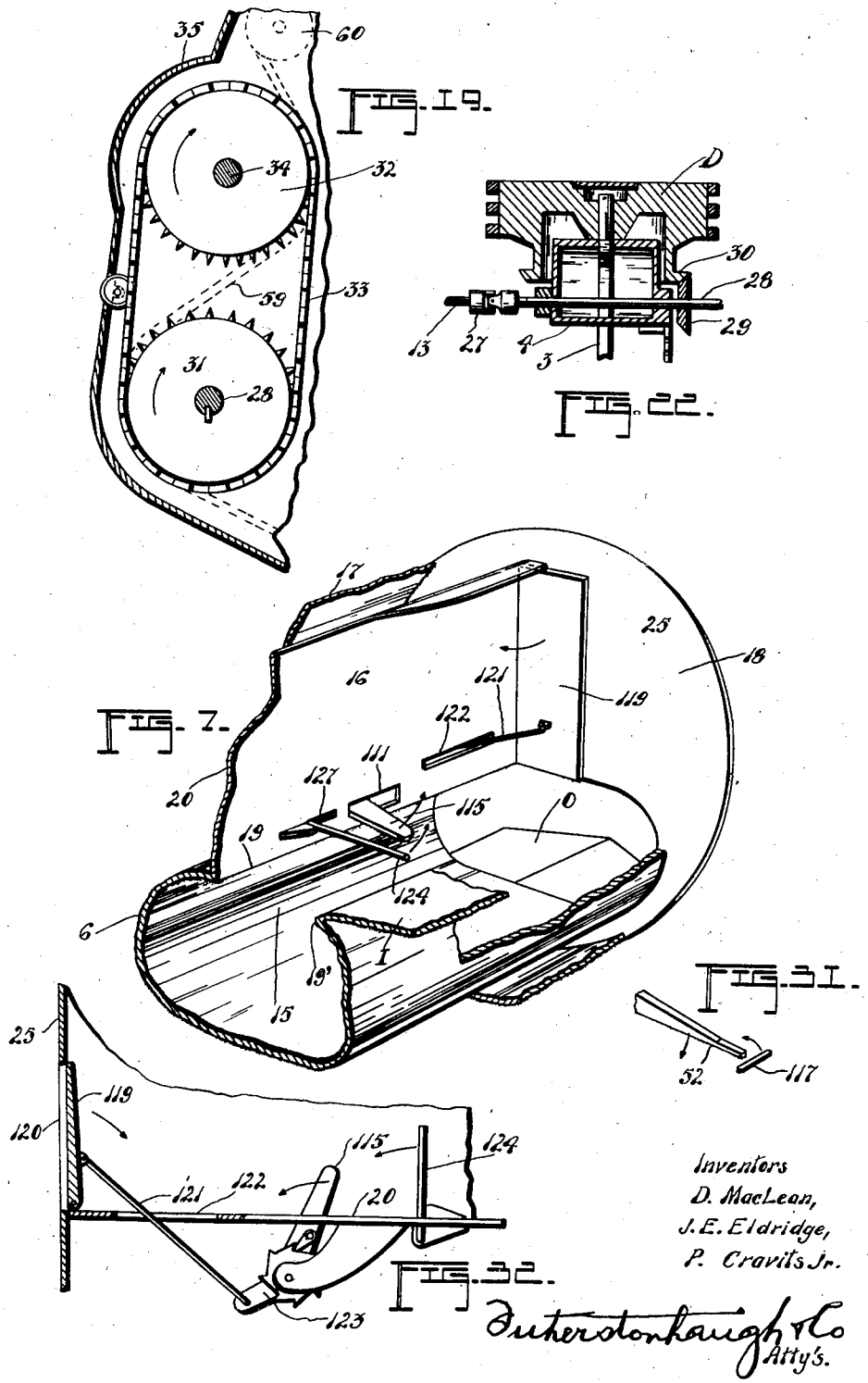

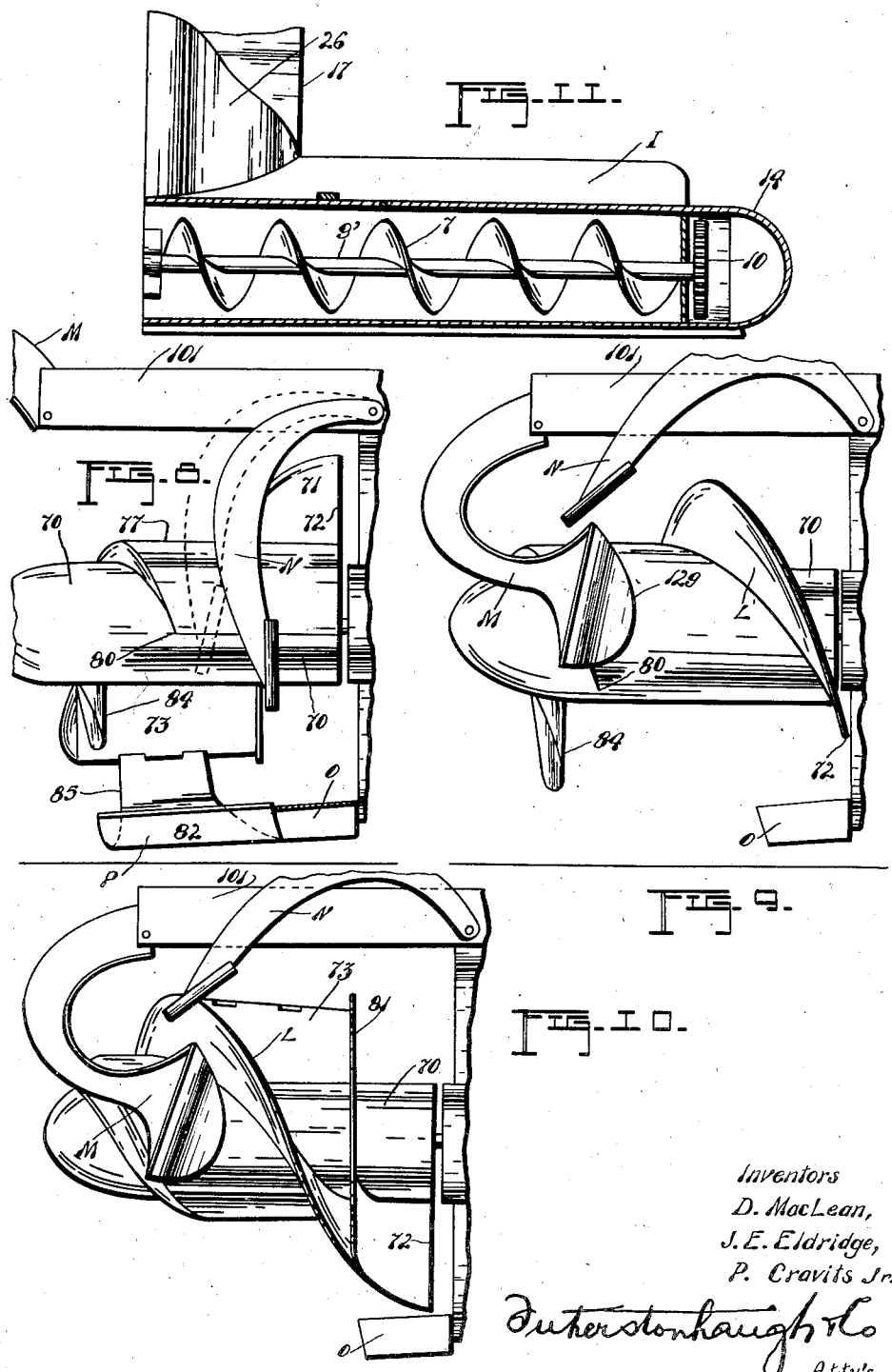

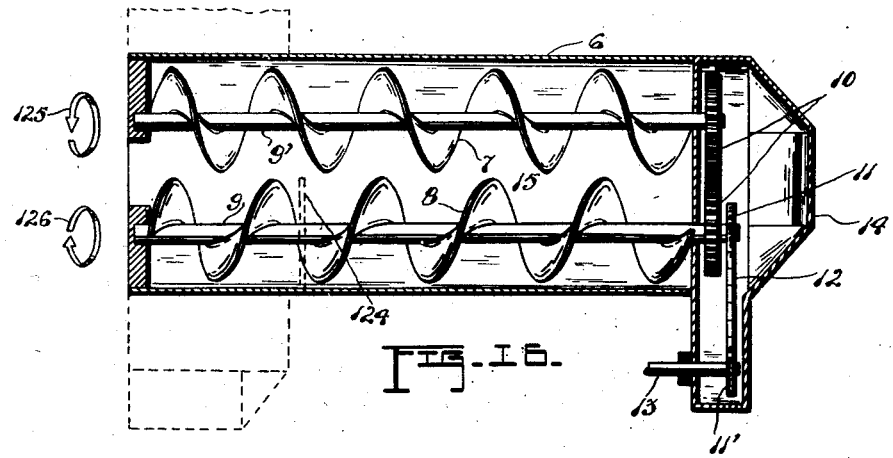
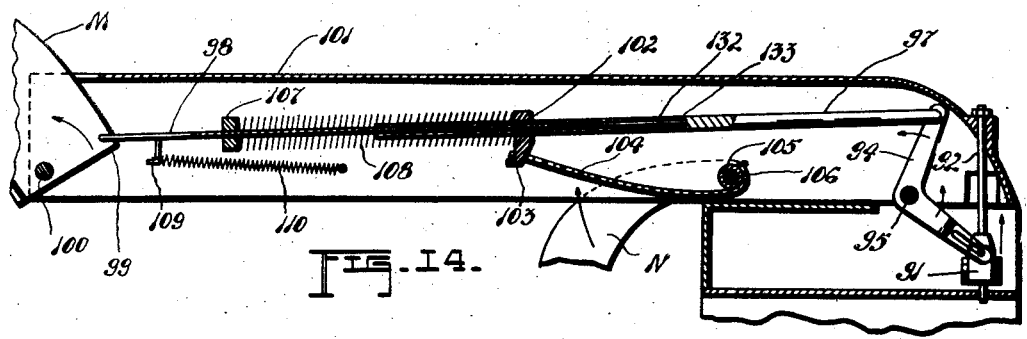
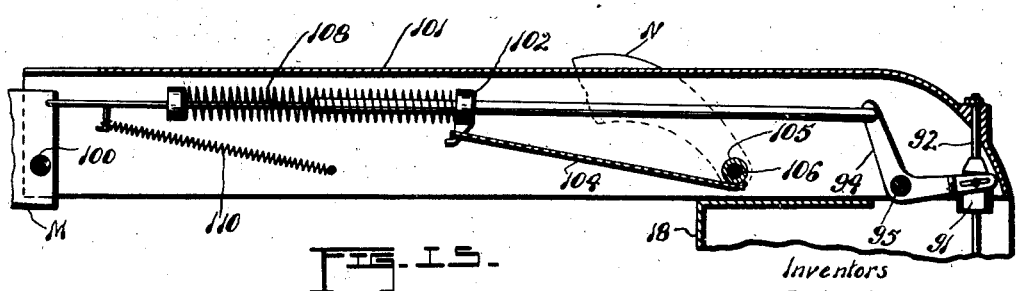

July 11, 1944.                D. MacLEAN ET AL                2,353,172
                              SHOCKING HARVESTER
                              Filed June 13, 1940          12 Sheets-Sheet 10
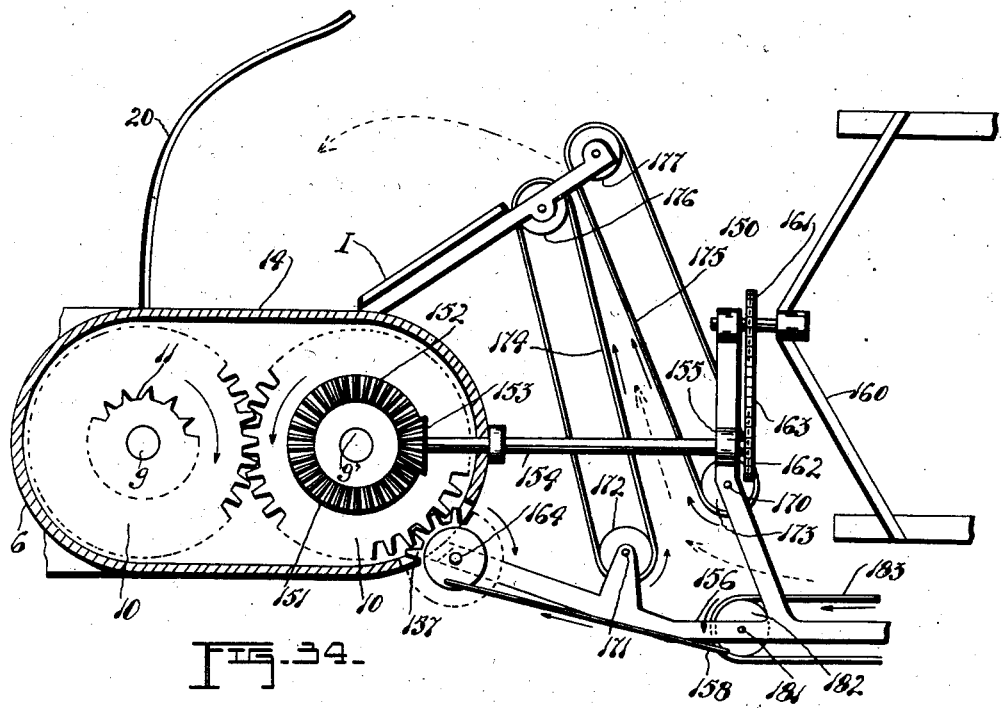
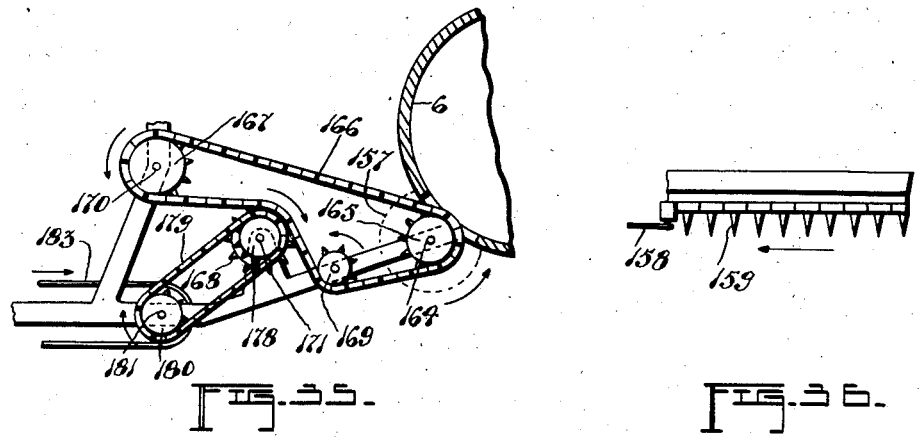
Inventors
D. MacLean,
J. E. Eldridge,
P. Cravits Jr.
Atty's.

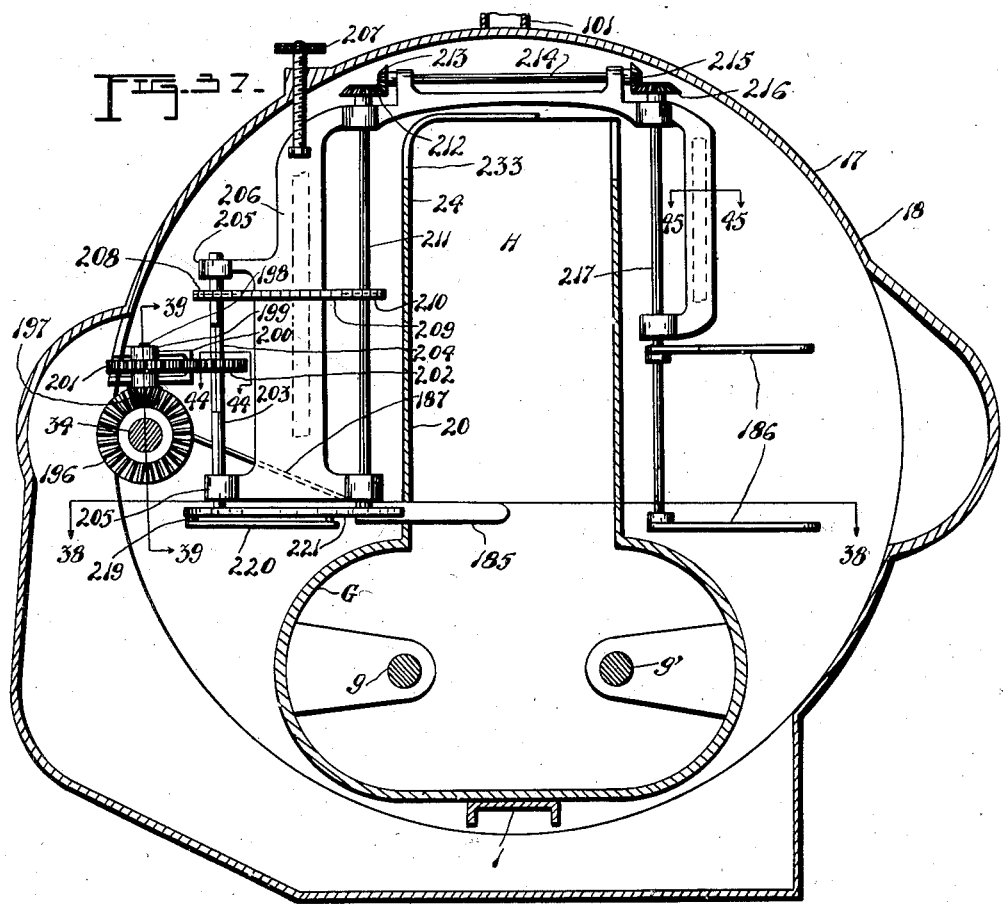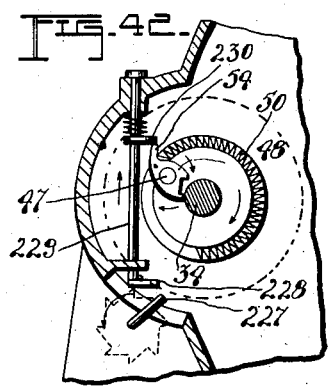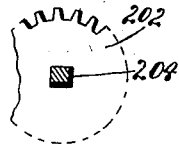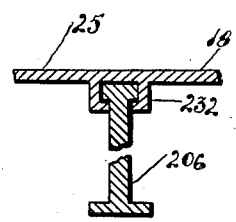

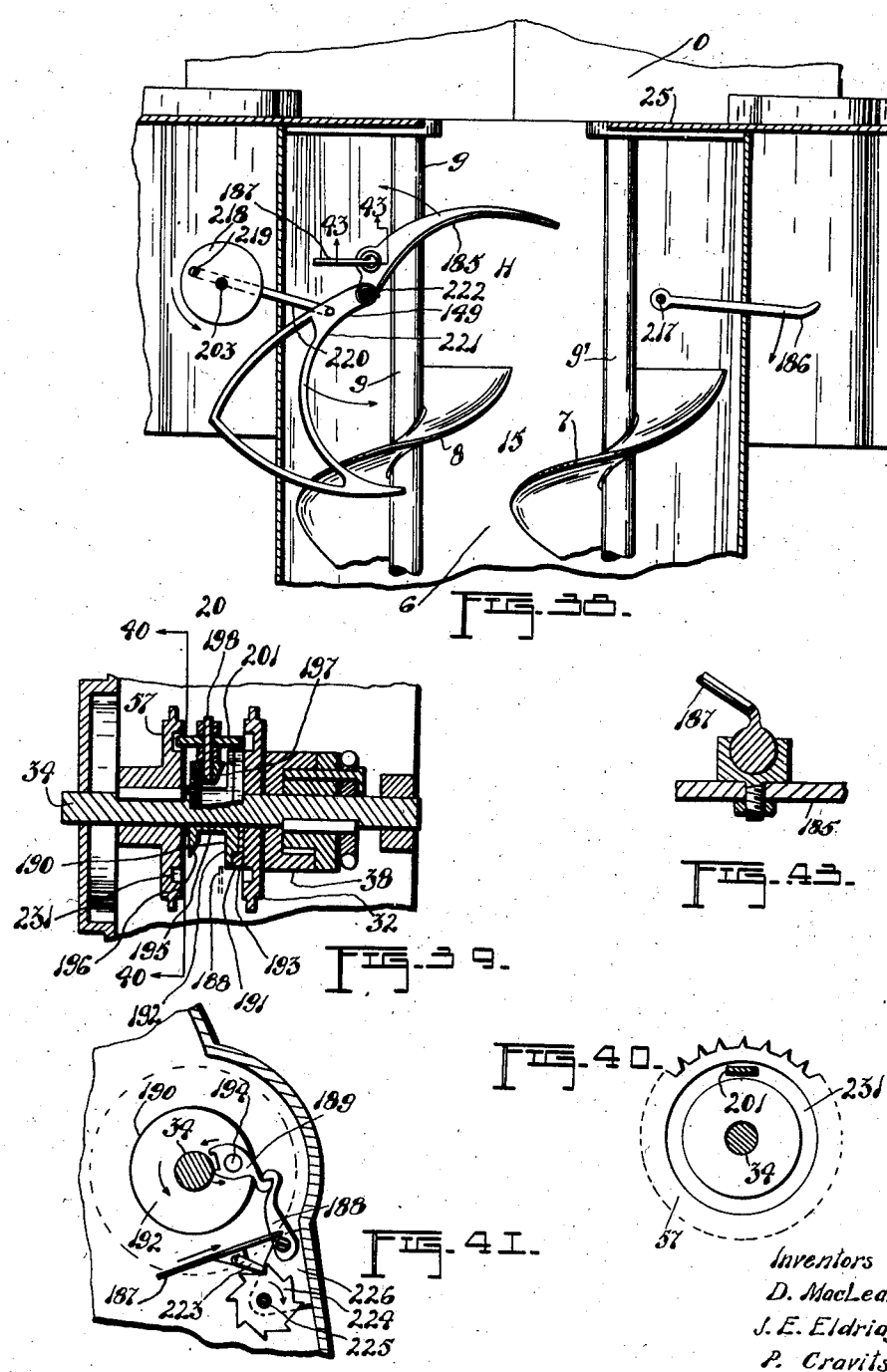

Patented July 11, 1944

2,353,172

UNITED STATES PATENT OFFICE 2,353,172

SHOCKING HARVESTER

Donald MacLean, Middlechurch, Manitoba, and James E. Eldridge and Phillip Cravits, Jr., Winnipeg, Manitoba, Canada Application June 13, 1940, Serial No. 340,376

10 Claims. (Cl. 56—404)

Our invention relates to improvements in shockers, a principal object of this invention being to provide a machine for erecting the stems of harvested plants and particularly cereal plants, such as wheat, oats and the like, into the form of a shock which will be well spread at the base or the butts thereof, well rammed into the stubble and well knit at the top, the shock being as well made and securely erected as it would be if made by competent harvest help, and this irrespective of the length of the stalks of the plants, or the weight of the heads, or the moisture or dryness of the plants or any other consideration.

A further object of our invention is to provide a shocker which will form the stems of harvested plants into shocks irrespective of whether the stems are bound into sheaves or are deposited onto the stubble unbound, the structural stability of the shock in either case being adequate to resist winds and the other hazards to which standing shocks are exposed.

A further object of our invention is to provide a shocker, the mechanism of which operates to effect the greater part of the spreading of the butts of the plant stalks before the bundle is deposited onto the stubble, a certain minority percentage of the spreading action, however, occurring after the core of the bundle makes contact with the stubble.

A further object of our invention is to provide a shocker in which the action of bundle forming, spreading the base of the bundle, depositing the bundle onto the stubble, forming, packing and pressing the same into the form of a shock after deposit of the bundle onto the stubble, is effected during the uninterrupted forward motion of the shocker.

A further object of our invention is to provide a shocker in combination upon a common wheeled framework with a reaping assembly embodying essentially a reel, cutter-bar, platform and elevator in conventional relationship and to one side of the shocker with a horizontally disposed knotter in the shocker itself, such combination thereby constituting a fully automatic harvester.

A further object of our invention is to provide a harvester or shocker of efficient appearance, fully enclosed, which is economical to manufacture and sell, which cannot easily become out of order and which generally will satisfactorily carry out the task for which it is intended under all practical conditions of harvesting.

With the above more important objects in view and such other minor objects as may appear as the specification proceeds, our invention consists essentially in the arrangement and construction of parts all as hereinafter more particularly described, reference being had to the accompanying drawings, in which:

Figure 1 is a side elevation of our shocker as it would appear while material in the form of loose stems or bound sheaves are being accumulated in the bundle chamber.

Figure 2 is a plan view of Figure 1.

Figure 3 is a section on the line 3—3 of Figure 2.

Figure 4 is an underside plan illustrating the front part of our shocker.

Figure 5 is a perspective illustration of our bundle chamber, step, and associated parts.

Figure 6 is a perspective illustration of our conveyor passage, hood and receiving platform.

Figure 7 is a perspective fragmentary illustration showing the interior of our conveyor passage.

Figure 8 is a fragmentary side elevation illustrating the right hand rotor viewed from the front of our shocker, showing the bundle platform and barrier arm in the yieldable position occupied while a bundle is being accumulated.

Figure 9 is similar to Figure 8 but illustrates a partial counterclockwise rotation of the rotor when viewed from the front of the shocker with the two parts of our bundle platform separated and out of sight, the yieldable barrier arm elevated and out of use and the packing arm bearing against the upper part of an imaginary bundle in process of being formed into a shock.

Figure 10 is similar to Figures 8 and 9 but shows the same rotor still further rotated in a counterclockwise direction viewed from the front of the shocker with the packing arm in the final stages of yieldable forming the upper part of what is by now a shock, the barrier arm still being elevated.

Figure 11 is a side sectional elevation illustrating the conveyor screw which will constitute the right hand conveyor screw looking from the front of our shocker, and illustrating our inclining stem receiving platform and a portion of the curved entrance to our bundle chamber.

Figure 12 is a section on the line 12—12 of Figure 3.

Figure 13 is a fragmentary showing viewed from the front of our shocker and illustrating the link and cam action governing the movement of our barrier and packing arms.

Figure 14 is a section on the line 14—14 of

Figure 2 illustrating our packing arm in elevated position and our barrier arm in lowered position.

Figure 15 is similar to Figure 14 but illustrates our packing arm in lowered position and our barrier arm in elevated position.

Figure 16 is a plan view illustrating our conveyor passage with the housing thereof shown in section, our conveyor screws and drive gear assembly.

Figure 17 is a section approximating to lines 17—17 of Figure 1.

Figure 18 is a perspective illustration of our barrier arm and plate.

Figure 19 is a section approximating to the line 19—19 of Figure 2.

Figure 20 is a rear elevation of the right hand rotor, spiral shapers, one of the two hinged parts of our bundle platform and finishing wings, all considered as being viewed from the rear of our shocker.

Figure 21 is a section on the line 21—21 of Figure 1.

Figure 22 is an underside sectional plan illustrating our bull wheel and main drive shaft.

Figure 23 is a plan detail illustrating the stem erecting arm which projects into our conveyor passage, the ratchet dog which also projects into our conveyor passage and the associated ratchet mechanism which operates clutch mechanism to effect rotation of our rotors.

Figure 24 is a detail illustrating our clutch releasing arm and associated bracket, the same being located on the wall of our circular rotor drive housing.

Figure 25 is a detail illustrating our clutch for bringing the rotors into operation, this detail approximating to the line 25—25 of Figure 17.

Figure 26 is a section on the line 26—26 of Figure 12.

Figure 27 is a section on the line 27—27 of Figure 12.

Figure 28 is a section on the line 28—28 of Figure 23.

Figure 29 is a section on the line 29—29 of Figure 23.

Figure 30 is a perspective detail illustrating the rocker arm mechanism employed in the actuation of our packing arm and barrier arm, and should be viewed in conjunction with Figures 13, 14 and 15.

Figure 31 is a perspective detail illustrating our clutch releasing arm and clutch actuating rod.

Figure 32 is a plan detail illustrating our door and associated mechanism, which is positioned at the rear end of our bundle chamber and immediately in front of the step, which should be viewed in conjunction with Figure 7.

Figure 33 is a diagram illustrating the cycle of operations of the various parts of our shocker.

Figure 34 is a front view partly in section illustrating our shocker in combination with a reaping assembly.

Figure 35 is a detail in elevation as seen from the rear of the assembly of Figure 34, showing our sprocket drive to the reel, platform and elevator.

Figure 36 is a plan detail illustrating our cutter-bar and pitman connected thereto.

Figure 37 is a front sectional elevation illustrating our circular rotary drive housing, bundle chamber and conveyor passage, with knotter projecting into our bundle chamber and means for operating the knotter.

Figure 38 is a plan detail illustrating our knotter, conveyor screws and bundle chamber, this view approximating to line 38—38 of Figure 37.

Figure 39 is a section on the line 39—39 of Figure 37.

Figure 40 is a section on the line 40—40 of Figure 39.

Figure 41 is a detail in elevation viewed from the rear of our harvester as per Figure 34, illustrating our clutch actuating mechanism for operating the horizontal knotter.

Figure 42 is a detail similar to Figure 41, in elevation, but viewed from the front of our harvester as per Figure 34.

Figure 43 is a section on the line 43—43 of Figure 38.

Figure 44 is a section on the line 44—44 of Figure 37.

Figure 45 is a section on the line 45—45 of Figure 37.

In the drawings like characters of reference indicate corresponding parts in the different figures.

While numerous inventions have been made for forming shocks from a bundle of harvested plants, we are unaware of any which could operate successfully to spread the butts in the manner necessary to provide a firm base or foundation for a shock, or which effectuates mechanically the manual operation of bonding or knitting the heads of the bundle together by the necessary ramming action at, and above, the waist of the bundle, which action is required in order to provide shocks which will withstand the action of winds or rain, snow and the like, and proceeding now to describe our invention briefly and in its essentials as a prelude to the detailed description following thereafter, it will be seen by reference to the accompanying Figures 1, 2, 3, 5, 7 and 8 to 10, that the same consists of a wheeled framework A embodying the skeletal chassis members B and C, bull wheel D, the wheel E and the truck F at the forward end of our shocker.

Upon this wheeled framework is located a conveyor passage G, within which are oppositely and rearwardly rotating screw conveyors which carry the harvested plants (hereinafter called "stalks") rearwardly to a bundle chamber H, which itself is actually the rear end of the conveyor passage.

The stalks are delivered to the conveyor passage via a platform I in horizontal position and means are provided in the passage for erecting the same into the vertical during their journey therethrough.

Mechanism is provided in the conveyor passage capable of being tripped by the stalks during their travel therealong, which will operate the horizontally disposed, spaced, parallel and longitudinally extending rotors J and K in opposite directions so that spiral shapers L extending therearound will perform their task in packing the heads or upper parts of the stalks together in conjunction with a yieldable packing arm M, which also bears against the rear side of a bundle emerging from the bundle chamber H.

The stalks either loose or in the form of sheaves, accumulate into a bundle of the desired size to constitute a shock against a yieldable barrier arm N, which is capable of yielding to permit the bundle to emerge gradually onto the shallow, wedge-shaped step O and onto the removable, divided, shallow, wedge-shaped platform P, the two parts of which are hinged each to one or the other of the rotors J and K.

Normally while a bundle of unbound stalks or a bundle of sheaves is accumulating as aforesaid, the packing arm is elevated by best illustrated in the accompanying Figures 1 and 2, but when movement of the rotors commences, this member moves downwardly to the position illustrated in Figures 9 and 10, while the barrier arm snaps upwardly, the whole operation being such that upon emergence of a bundle onto the step O and the platform P, the base thereof is spread by virtue of the shallow, wedge-shaped cross-section thereof, such spreading action being assisted, however, upon separation of the two parts of the platform so that the core of the bundle makes contact with the stubble first while the butts of the outer stalks in the bundle tend to be spread out to a certain extent fanwise and meet the stubble in this position.

While this is taking place, the shocker is moving forward at a constant speed, as a result of which the heads thereof are caused to bond or be interknitted with the heads which are in the core of the bundle, by the packing arm L.

Furthermore, the butts in the front part of the bundle will tend to "drag" off the step O as the shocker moves forward, with the result that these stalks will incline rearwardly and all the while this is taking place, the shapers (to be described in detail hereinafter) are rotating rearwardly with respect to the accompanying plan view Figure 2, and moving rearwardly so that the shock as a whole is stationary upon the ground in spite of the forward motion of the machine, these shapers together with the packing arm effecting the bonding or knitting together of the heads.

The result is a succession of standing shocks corresponding in all respects to those made by competent harvest help, who make a practice in forming the core of a shock, of grasping the first two sheaves together by the twine which encircles the waists thereof and ramming them together so that the butts are pressed into the stubble and the heads pressed together. The outer sheaves are piled around and the same pressure should be applied to all the sheaves to some extent in order to make for a firm shock.

Figures 8 to 10 of the accompanying drawings assist in illustrating the sequence of action of the right hand rotor when viewed from the front of the shocker, the progressive rotation of the spiral shaper thereof and the action of the packing and barrier arms, Figure 8 representing the latter as yielding against a bundle partially emerging from the bundle chamber onto the step and platform P while Figures 9 and 10 illustrate our packing arm in descended position and yieldably bearing against the rear part of the bundle, against the forward side of which the spiral shaper is exerting an opposite pressure. Figure 10 particularly illustrates how the planes of the packing arm and the spiral shaper tend to converge, thereby forming the bundle into a more or less conical shaped shock.

Having now provided a brief preliminary description of the essentials of our invention and the essential sequence of operations thereof, a detailed description will be given.

The framework of our shocker best seen from the underside of the accompanying Figure 4, may of course be modified in many ways but in the present instance, comprises the longitudinal channel 1, to the forward end of which is connected a draw-bar 2, upon which a conventional front truck F is mounted. Connected to the channel 1 and extending at right angles thereto is a structural member 3, upon which is mounted our bull wheel D, which is the immediate source of power by which the mechanism of our shocker is actuated, the immediate connection between the hub of the bull wheel D and the outer end of the structural member 3, being suitably enclosed by the housing 4, while the free running wheel E is journalled at the outer end of a horizontally extending and diagonally disposed structural member 5.

Positioned upon the foregoing skeletal structure is a conveyor housing 6, best illustrated in the accompanying Figures 1, 2, 4, 6, 7, 11 and 16, and of the configuration clearly illustrated in these figures, from the latter of which it will be seen that the same contains a pair of horizontal, longitudinal extending parallel spiral screws 7 and 8, the shafts 9 and 9' of which are suitably journalled at the ends, the forward ends thereof being keyed to spur keys 10, so that the flights of the screws rotate in opposite directions, the extreme front end of the shaft 9 having a sprocket wheel 11 keyed thereto, in engagement with a sprocket wheel 11' via the sprocket chain 12, which latter is keyed to the front end of our counter drive shaft 13. The intermeshing spur gears and the associated sprocket assembly constitute the drive gear from which associated reaping mechanism hereinafter to be described, derives its motion, and it will be noted that this drive gear is suitably encased by the housing 14.

By reference to the accompanying Figures 6 and 7, it will be seen that the housing 6 is open, to provide a passage 15 (see also Figure 16), along which stalks may be conveyed rearwardly to the screws 7 and 8, and this passage is open for its entire length until it enters what we herein designate as our bundle chamber H, best illustrated in the accompanying Figure 5, but which may also be said to constitute the area 16 at the rear end of the conveyor passage within the confines of the circular walls 17, which forms part of our rotary drive housing 18.

By reference to the accompanying Figure 6, it will be seen that the longitudinally extending channel 17 which exists between the edges 19 and 19' of the housing 6, is superimposed by a sheet metal hood 20 integral with the housing, while the stem receiving platform I is secured to secured to the edge 19', being inclined as clearly illustrated but more sharply at the forward part 21 thereof than at the rear part 22.

By reference to the accompanying Figures 5, 6 and 7, it will clearly be seen that the rear ends 23 and 24 of the housing 6 and hood 20 respectively, terminate at the rear wall 25 of our rotor drive housing 18, while an end wall 26 of the configuration clearly illustrated in the accompanying Figure 6, is provided at the rear end of the platform, and considering now our circular drive housing 18, we would direct particular attention to the accompanying Figures 3, 5, 7, 12, 13, 17, 19, 22 and 28 to 30 inclusive, wherein the mechanism enclosed thereby and the associated driving mechanism is best illustrated.

The main drive shaft 13 best illustrated in the accompanying Figures 2, 4 and 22, terminates at the rear end thereof in a universal connection 27, to which is also connected our main drive shaft 28, a bevel pinion 29 being keyed to the shaft 28 and engaging with a bevel gear 30 integral with the bull wheel D and by reference to the accompanying Figure 12, it will be seen that the shaft 28 extends into a transmission housing 30', being journalled in the rear wall thereof, the location of such housing with reference to our rotor drive housing 18 being best illustrated in the accompanying Figures 3 and 5, from which it will be seen that the same really constitutes an outwardly projecting domed portion of the larger housing.

A sprocket 31 is keyed to the shaft 28 and engages with a sprocket 32 via a sprocket chain 33, the sprocket 32 being freely mounted upon a rotor shaft 34, extending through the housing 35 and journalled in the rear wall 36 thereof, this shaft terminating in a projecting bearing 37 secured to the front edge of the surrounding wall of the housing.

Mounted upon the shaft 34 is a single revolution clutch 38 best illustrated in the accompanying Figures 12, 17, and 25 to 27, from which it will be seen that the part 39 is keyed to the shaft while the encircling recessed portion 40 is integral with and secured for rotation with the sprocket wheel 32.

The part 39 consists of a disk 41 receivable into the portion 40 with a semicircular notch 42 formed in the periphery thereof, semicircular notches 43 capable of alignment with the notch 42 being formed upon the inner surface of the flange of the portion 40, within which the disk 41 is recessed.

Also mounted freely upon the shaft 34 and integral with the disk 41 is a larger disk 44, and secured to the outer surface of this disk is a third disk 45, provided with a perimetrical groove 46. Extending through the circular aperture in the disks 44 and 45 in eccentric relationship with respect to the axis of rotation thereof, is a dog 47, this dog projecting through the exposed surface of the disk 45 and being keyed to a pawl 48 of the configuration clearly illustrated in the accompanying Figure 17.

The dog is of cylindrical configuration for that part of the length thereof which is socketed into the pawl and for that part of the length thereof which proceeds through the members 44 and 45, but is provided with a projecting nose 49 of the cross-sectional configuration clearly illustrated in the accompanying Figure 26, which normally nests within the notch 42 in the perimeter of the disk 41 but upon rotation thereof, projects into one of the recesses 43 when in alignment therewith so that the shaft 34 is rotated.

Extending around the disk 45 in the groove 46 thereof, is a spring 50, one end thereof being anchored to a stud 51 in the groove, and the other anchored to the pawl 48, so that a force is exerted on the pawl tending to rotate the same in a clockwise direction with respect to the accompanying Figure 17.

Secured to the wall 17 just above the housing 35 is a bracket 51, to which is journalled a clutch releasing arm 52 of the configuration clearly illustrated in the accompanying Figure 17 and designed to be rotated by mechanism later to be described in a clockwise direction. The nose 53 of this arm normally bears against the nose 54 of the pawl 48, and hence maintains the same in the position clearly illustrated in the accompanying Figure 17 against the pull of the spring 50, and here it will be noted particularly that the pawl 48 is provided with a pair of nubs 55 and 56, which limit the movement of the pawl by bearing against the shaft 34.

Keyed also to the shaft 34 is a rotor drive sprocket 57 and between the sprockets 32 and 57, is a spacing collar 58, by means of which the former (which is free) is held close up against the keyed portion 39 of our clutch 38, the sprocket 57 having in mesh therewith a sprocket chain 59 best illustrated in the accompanying Figures 3 and 19, which passes around idler sprockets 60, 61 and 62, projecting inwardly upon brackets from the circular wall 17, around the rotor drive sprocket 63, downwardly around the idler sprockets 64, 65 and 66 which also project inwardly upon brackets in a similar manner to the sprockets 60 to 62 inclusive, after which the chain proceeds around the large idler sprocket 67.

The rotor drive sprockets are keyed to rotor shafts 68 and 69, upon which are mounted for rotation therewith, our rotors J and K, which are best illustrated in the accompanying Figures 1, 2, 3, 9, 10 and 20, the same each consisting of a core 70, surrounding which is a primary spiral shaper 71, which commences adjacent the rear wall 25 of our rotor drive housing, this commencing point or edge being identified with the numeral 72, in order that the rear view 20 may be better correlated with the side elevations 1 and 8 to 10 and the plan view 2, while the terminating point of the primary spiral shapers is indicated by the numeral 72' and will be seen by reference to Figures 8 and 20 particularly, to be inwardly curved and to continue at the slight angle best illustrated in Figure 20, forwardly in form of a plate 73.

The primary shapers 71 will accordingly be seen to extend spirally around only a part of the circumference of the rotor cores 70, and in fact extend from the points 74 and 75 (Figure 20) through approximately 325° although the portion 76 adjacent the edge 72 is preferably flat and at right angles to the longitudinal axis of the rotors, so that the part of the primary shaper which is actually pitched, extends around only approximately 180°, making due allowance for the curvature at the points 73.

Extending around the cylindrical bullet shaped core 70 of the rotors, is a volute 77, and of course the core may be so shaped that the volute portion is formed of the same shell as the core, or alternatively, the volute may comprise a separate sheet wrapped around that portion of the core over which it extends. Its configuration will be clearly apparent, however, from the accompanying figures above referred to and by reference to the accompanying Figure 20 particularly, it will be seen that its radius with respect to the axial point 78, increases from the horizontal merging edge 79 to the terminating point 80, which from the adjacent shading will be seen to curve inwardly before merging into the core. Graphical representation of this final merging process will also be seen by reference to the accompanying Figures 8 and 9. By reference to the accompanying Figure 20 particularly, it will be seen that the actual pitch of the volute extends through a circumference of approximately 270°.

A cut-off panel 81 of the configuration clearly illustrated in the accompanying Figures 1 and 10, is provided, this panel merging as clearly illustrated with the underside of the primary shapers L and curving to the starting edges 32 thereof, terminating at the front edge of the plate 73, and reverting now to the plate 73 itself, it will be seen that hingedly attached to the lower edge thereof, is one part 82 of our divided bundle platform P, the front edges 83 of each of the parts thereof resting upon our shallow, wedge-shaped step O when the rotors are in normal position.

Finally in connection with our rotors L, we would explain that the same are each provided with a projecting wing 84 of the configuration most clearly perceived from the accompanying Figures 1, 2, 8 and 9, secured to the core of the rotor adjacent the point 75 and along the face side of the panel 73 to prevent stalks or sheaves of stalks from falling off the rear edge 85 of our bundle platform, while the same are accumulating thereon prior to being deposited onto the stubble.

Proceeding next to describe our yieldable barrier arm and packing arm, M and L, respectively, and referring particularly to the accompanying Figures 3, 13, 14 to 16, 18, 21 and 28 to 30 inclusive, it will be seen that upon the rotor shaft 68 and in front of the sprocket 63 is a cam 86 of the configuration clearly illustrated in the accompanying Figure 13, and adjacent the cam and pivoted upon a bracket 87 secured to the inner surface of the circular wall 17, is a curved follower arm 87′, pivotally secured to the cam engaging end 88 of which is a curved lever 89, forked at the upper end 90 thereof to engage a squared collar 91 designed to slide vertically upon a fixed stem 92.

The forked and slotted end 93 of a bell crank 94 designed to rock upon the stub shaft 95, is also secured to the collar 91, the arm 96 of the bell crank having freely secured thereto a rearwardly extending rod 97, which is hollow as clearly illustrated in the accompanying Figure 14 for a substantial portion of its length, to receive a packing arm actuating, telescopic rod 98, the rear end of which is secured to the corner 99 of the arm itself, which arm is seen to be pivoted at the point 100 at the rear end of a casing 101, within which the foregoing mechanism is housed.

Keyed to the rod 97 at the point illustrated in the accompanying Figures 14 and 15, is a collar 102 integral with which is a projecting eye 103, to which is anchored a piece of chain 104, the opposite end of which chain is anchored to a small drum 105 keyed to rotate with the stub shaft 106, to which member the barrier arm is in turn keyed for rotation therewith. Accordingly, the drum, stub shaft and arm N rotate together, the stub shaft being suitably journalled in the walls of the casing 101.

At the point indicated upon the packing arm, actuating telescopic rod 98, is keyed a second collar 107 and between the collars 102 and 107 a stiff spiral spring 108 is freely positioned. Projecting downwardly from the rod 98 is also a small angulated bracket 109, to which is anchored a lighter spiral spring 110, anchored at the opposite end thereof to either of the side walls of the casing 101.

Referring next to the means we employ for operating our single revolution clutch best illustrated in the accompanying Figures 12, 17 and 23 to 27 inclusive, attention is drawn particularly to the accompanying Figures 6, 7, 23, 28 and 31, from which it will be seen that upon the side of the hood 20 is an aperture 111, an outwardly projecting bracket 112 of the configuration best illustrated in the accompanying Figure 6, being located adjacent the aperture 111. Between the arms of the bracket is a horizontally disposed sheaf counting ratchet 113, this ratchet being keyed for rotation with a vertical stub shaft 114 journalled in the apertures 115 provided at the end forming the bracket 112.

Immediately beneath the ratchet 113 and freely mounted upon the stub shaft 114 is a horizontally disposed, trip lever 115′ which projects through the aperture 111, this trip lever being provided with a pawl 116 engageable with the ratchet of the wheel 113. Immediately below the trip lever 115′ is a horizontally disposed striker arm 117 keyed to the stub shaft 114 for rotation therewith and progressively rotatable with the ratchet upon repeated action of the trip lever to brush the clutch releasing arm 52 to actuate the associated clutch 38.

Finally in connection with this detail, it will be noted that we provide a light tension spring 118, one end of which is anchored at the point indicated upon the trip lever 115′ and the other to the bracket, to return the trip lever 115′ to the right with respect to the accompanying plan detail Figure 23.

In the accompanying Figures 7 and 32 is illustrated a gate 119 designed to close the rectangular aperture 120 (Figures 5 and 32) to assist in the extrusion of sheaves onto the step and associated bundle platform P, this gate being actuated by the ratchet counter-mechanism just described.

It will be seen that a connecting rod 121 extends through a horizontal slot 122 in the hood 20 within the area of the bundle chamber, this link terminating in an outwardly projecting arm 123 rotatable with the trip lever 115′ so that in effect the two members 115′ and 123 constitute a bell crank and it follows that upon counterclockwise rotation of the trip lever 115′ and the brushing influence of a passing sheaf being moved along the screw conveyor, the gate 119 will be opened to a corresponding extent so that whatever the thickness of the sheaf, if it passes the trip lever it will always find the gate 119 sufficiently far opened to permit its passage therepast.

It will be noted that the gate 119 is located above the screw conveyors 7 and 8 and therefore assists in knocking the heads of the sheaves outwardly through the aperture 120.

Having now explained the structure of the accompanying Figures 1 to 33 inclusive in detail, we will now describe the operation of the structure illustrated in these figures, explaining certain remaining details of construction while doing so.

Description of shocker operation

During the passage of our shocker over the stubble, sheaves or loose stems are elevated by the conventional canvas elevator on the adjacent binder and fall horizontally upon the receiving platform I, which inclines downwardly from the elevator to the conveyor passage 15, into which conveyor passage the material to be shocked falls horizontally, the butt ends of the sheaves or stalks being engaged by the spiral screws 7 and 8 while the heads fall across an obstructing rod 124 (Figures 7 and 16), with the result that as the screws rotate, the material is lifted into the vertical, and here it should be particularly noted by reference to the accompanying Figure 16, that the flights of the two spiral screws 7 and 8 are pitched in opposite directions so that as they rotate respectively in the direction of the band arrows 125 and 126, the butts of the stalks tend to be drawn downwardly by the frictional action of the adjacent flight surfaces. The screws themselves obviously are rotated by the spur gears 10, which are rotated via the sprockets 11, 11′, the interconnecting sprocket chain 12 and the secondary drive shaft 13, which in turn is rotated by the bevel pinion 29, which derives its movement from the gear 30 upon rotation of the bull wheel D over the stubble.

When the stalks have been fully elevated, the rod 24 yields, reference being made in this context to the accompanying Figures 6, 7 and 29, from which it will be seen that the rod projects into the passage through a horizontal rectangular aperture 127 formed in our hood 20, and is pivoted upon a bracket 128, within the limits of which is a returning spring 129, and as the stalks proceed onwardly into the bundle forming chamber H, they brush the lever 115, rotating the same in a counterclockwise direction which causes the associated pawl 126 to rotate the counter-ratchet 133 in a counterclockwise direction with respect to the accompanying plan view, Figure 23.

This causes the striker arm 117 to rotate also in a counterclockwise direction to the extent of one notch of the associated ratchet and assuming now by way of example that seven sheaves have already accumulated past or to the rear of the lever 115, the striker arm 17 will be in such position that the brushing action past the lever 115 of the eighth sheaf will cause the striker arm to depress the clutch releasing arm 52 and thereby set the associated clutch 48 in motion.

This in turn will operate our rotors J and K in the manner to be described in detail hereinafter but we would first explain that the main shaft 28 which derives its rotation from the bevel pinion 30 through the pinion 38, rotates the sprocket 31 which is keyed to the shaft 28 and also the sprocket 32, which runs loose on the shaft 34. It follows that these two sprockets rotate continuously and with them the encircling recessed portion 40 of the clutch.

The part 39 of our clutch, however, being keyed to the shaft 34 remains normally stationary but when the clutch releasing arm 52 is depressed, the nose 53 thereof rotates in a clockwise direction with respect to the accompanying Figure 17, so that it becomes disengaged from the nose 54 of the pawl 48, which thereby rotates in a clockwise direction under the influence of the spring 50 until the nub 55 comes up against the shaft 34.

Since the dog 47 rotates with the pawl, it is to be understood that the projecting nose 49 thereof rotates sufficiently to move to a certain extent out of the semicircular notch 42 and into the first of the semicircular notches 43 which comes into alignment. Thus the part 39 becomes locked to the part 40, whereupon the sprocket 32 makes one complete revolution and also of course, the disk 45 upon which the pawl 48 is mounted and when the nose 54 of the pawl returns to the position illustrated in the accompanying Figure 17, it will shove the nose 53 of the clutch releasing arm, whereupon it will be obliged to rotate in a counterclockwise direction to the extent of a few degrees until the nub 56 comes up against the shaft 34, after which no further rotation of the clutch is possible. It must be understood in this context of course that the arm 53 is spring returnable in a counterclockwise direction with respect to the accompanying Figure 17, so that the end which is engaged by the striker arm 117 arises again directly after it is disengaged from the arm.

Having explained how the shaft 34 which operates the rotor K is actuated, we would proceed to explain that as soon as such rotation of the shaft takes place, the sprocket 57 is also caused to rotate, being keyed to the shaft. In this way motion is imparted to the chain 59, particular reference in this context being made to the accompanying Figure 3, from which it will be clearly apparent that under this circumstance the rotor drive sprocket 63 and the shaft 68 must also rotate, but in the opposite direction to the sprocket 67 in view of the arrangement of the chain 59.

With the rotation of the shaft 68, the cam 86 (Figure 13) rotates in a counterclockwise direction and causes the follower arm 87' to rotate about its pivot point in a counterclockwise direction, which has the effect of lifting the squared collar 91 owing to the fact that the distance between the cam engaging end 88 of the follower arm and the position of the squared collar as shown in the accompanying Figure 13 is shortened.

When the squared collar rises on the stem 92, the bell crank 94 is rotated in a counterclockwise direction with respect to the accompanying Figure 30, which obviously end-shifts the rearwardly extending rod 97 to the left with respect to the accompanying Figure 14.

When the rod 97 moves in this way, the telescopic rod 98 will also be end-shifted to the left, owing to the interposition of the spiral spring 108 between the collars 102 and 107 fixed to the rods 97 and 98 respectively, the spring 108 being sufficiently stiff so as not to compress under pressure from the rod 97 or expand under the weight of the packing arm M, which exerts a tensile force thereon.

The packing arm M accordingly rotates in a counterclockwise direction with respect to the accompanying Figures 14 and 15 about the point 100 and as the rod 97 is end-shifted to the left with respect to these figures, the chain 104 is also drawn taught since the attaching collar and projecting eye 102 and 103 respectively are fixed to the rod 97 and as tension on the chain increases, the end thereof which is anchored to the small drum 105 rotates the drum in a clockwise direction and raises the barrier arm N as clearly illustrated in the accompanying Figure 15.

The foregoing sequence of movement takes place during the rotation of the rotors J and K and by a careful consideration of the contour of our cam 86, it will be apparent that the rods 97 and 98 are drawn to the right to raise the packing arm M and lower the barrier arm N in a quick return action slightly before the rotors have completed one complete revolution. Thus the packing arm M is elevated up out of the way as soon as a shock has been formed while the barrier arm is down to limit the extrusion of a further supply of sheaves or stalks onto the step O and the platform P.

Proceeding to explain now precisely what happens during the rotation of our rotors J and K and directing particular attention in this context to the accompanying Figures 1, 2, 8 to 10 inclusive and 20, it is to be understood that immediately upon actuation of the rotor shafts 34 and 68, the rotors J and K themselves commence to move counterclockwise and clockwise respectively with respect to Figures 1, 2 and 8 to 10 inclusive as viewed from the right of these figures, or in opposite directions when viewed from the left or rear of these figures as is the case with the accompanying Figures 20, which obviously represents the rotor K and will be seen rotates in a counterclockwise direction.

It will be noticed from Figure 2 that the commencing point or edge 72 of the spiral shaper on the rotor J is set slightly in advance of the corresponding edge of the shaper K. It is also to be understood that when a bundle of sheaves or bundle of stalks is ready to be packed, shaped and deposited onto the stubble in a form of a shock, the butts are mostly out on the platform P or upon the step O, being held against any possible tendency to fall off the rear of the platform by the wings 84 which are provided for this purpose, and that the stems from the forward side of the bundle are leaning to the left with respect to the accompanying figures above noted, and are therefore out beyond the rear wall 25 so that as the shapers advance inwardly, they will cut in back of them and when the shapers have rotated between approximately 25° and 40° the yieldable barrier arm N (which has of course yielded considerably to the left as it is capable of doing) is snapped upwardly, the position from which it is snapped upwardly being occupied by the curved plate 129 of the packing arm M which has been moving down meanwhile.

Almost immediately after the rotors commence to move, however, the lapping edges 83 of the two parts of the hinged bundle platform disengage the rear edge of the step O whereupon these parts drop and fall outwardly as illustrated by chain lines in the accompanying Figure 20, while the wings move apart. As rotation continues, the shapers engage the heads of the stems and it will be understood that since the shocker is moving ahead while this is taking place, the rearward travel of the shapers does not force the heads backwardly to an undue extent but simply packs them. It will also be understood that the plate 129 of the packing arm is holding the backs of the heads but the arm itself is also free to yield, the strength of the spring 108 being carefully calibrated.

While the foregoing is taking place, the volutes are rotating inwardly, thereby packing the heads together at the sides with the result that there is a four-sided packing action, at the front by the shapers, at the sides by the volutes and at the back by the plate of the packing arm and when the maximum thicknesses 130 of the volutes have rotated approximately 270° anticlockwise viewing our machine from the rear in this context and when (with particular reference to the accompanying Figure 20) the point of maximum compacting action has been reached, the packing arm snaps upwardly, the barrier arm being free to drop ready to act as a barrier against the next bundle of sheaves or stalks, although it will be understood that as the points 130 where the volute is of maximum thickness, come together, they effect an upward brushing action against the heads of the stalks and in effect tend to point them upwardly so that the packing action does not comprise a uniform horizontal force applied at the waists of the sheaves or stalks during the whole time a shock is being formed.

It is important to note that when the rotors have advanced approximately 70° from their starting position and as soon as the shapers have completely separated the stalks to be formed into a shock from the stalks which are accumulating in the bundle chamber, our partial rotor encircling cut-off panel 81 takes over the operation of preventing excessive extrusion of further material and it is to be understood that this wall is not spiral, but projects at right angles to the axis of rotation of the rotors, being best illustrated in the accompanying Figures 1, 2 and 10, the contour, commencing and terminating points being also noted in the accompanying Figure 20, the commencing point being designated by the numeral 131 while the terminating edge is coincident with the plate 73 at the front edge thereof, this being one of the plates to which one or other part of our bundle platform is hinged.

It will be apparent that our packing arm is free to yield as stated in view of the telescopic connection of the rod 98 which actuates it in the hollow rod 97 and by reference to the accompanying Figure 14, it will be seen that a space 132 extends between the end of the rod 98 and the end of the aperture 133 in the rod 97.

From the foregoing it will be apparent that material to be formed into a shock accumulates predominantly on the platform P and the step O, the barrier arm N yielding to the position illustrated in phantom lines in the accompanying Figure 8 for this purpose and it is again repeated here that although the packing and pressing action takes place mainly after the bundle has been deposited onto the stubble following the rapid separation of the two parts of the platform P, the butts of the stems have already been spread to a considerable extent by virtue of the shallow, wedge-shaped configuration of the step and the platform.

Describing in conclusion the cycle diagram illustrated in the accompanying Figure 13, the point 133 indicates the commencement of rotation by the cam 86, which continues acting as indicated by the semicircle 134 until it reaches the point 135 where it releases and allows the member 89 to drop. From the point 135 back to the point 133 as indicated by the semicircle 136, the cam idles.

It is to be understood that the second concentric circle 137 indicates the sequence of movement of our packing arm M, which commences to lower at the point 133 and completes its lowering action at approximately the point 138. It retains this position for the duration of the semicircle 139 (subject, however, to yielding against the heads of the bundle as previously described) until the point 135 is reached, at which point it snaps upwards and idles in the elevated position during the period of the semicircle 140.

The third concentric circle 141 illustrates the movement of our barrier arm N, which will be seen to rise at approximately the point 142, the same remaining elevated during the period of the semicircle 143 and lowering at the point 135 and remaining lowered for the period of the semicircle 144.

The fourth concentric circle 145 indicates the movement of the two parts of our platform P, from which it will be seen that the parts separate at approximately the point 146 and remain separated for the duration of the semicircle 147 until they reach the point 148.

In the accompanying Figures 34 to 45 inclusive, we have illustrated the manner in which a reaping assembly may be incorporated with the shocker previously described so as to form a unitary harvester including a horizontally disposed knotter 149 at the rear end of our passage 15, or in other words, within the bundle chamber H.

The reaping assembly collectively enumerated 150 in the accompanying Figure 34, will be seen to be operated from the reaping assembly drive gear 151 consisting of a bevel pinion 152 keyed to the conveyor shaft 9' at the front end thereof.

In mesh with this pinion is a smaller bevel gear 153 which in turn is keyed to one end of a reel drive counter-shaft 154 journalled at the opposite end thereof in a bearing 155 formed in our reaping assembly frame 156.

In mesh with one of the gears 10 is a gear 157, to which is eccentrically connected a pitman shaft 158, the oscillating movement of which operates a cutter-bar 159.

It will be seen that our reel 160 is operated by sprockets 161, 162 and a chain 163, the latter sprocket being keyed to the end of the shaft 154.

From the accompanying Figure 5 (which is a rear view) it will be seen that a shaft 164 is keyed to the gear 157 and extends longitudinally to be provided at the rear end thereof with a sprocket 165, around which passes a chain 166, which chain in turn rotates sprockets 167 and 168, being held in mesh with the latter to a sufficient extent by means of the idler sprocket 169.

Keyed to the sprockets 167 and 168 are shafts 170 and 171 respectively, which carry the rollers 172 and 173 respectively, and around the rollers extend the conveyor passages 174 and 175 respectively, such passages being held taut by rollers 176 and 177 at the upper ends thereof and slightly separated to permit stems to spill in horizontal position onto our receiving platform I.

Upon the extreme rear end of the shaft 171 is a sprocket 178, around which passes a sprocket chain 179, to engage a sprocket 180, keyed to the end of a shaft 181, which carries a roller 182 to operate a conventional canvas platform 183.

Proceeding now to describe the structure and explain the operation of our horizontal knotter 149 in its function of binding stalks into sheaves and of associated mechanism operative to set the rotors J and K in motion when a given number of sheaves have been tied, it will be seen by reference to the accompanying Figure 38 that when our shocker is manufactured integral with a reaping assembly we prefer to shorten the length of the flights 7 and 8 of the conveyor screws so that they terminate within the bundle chamber instead of proceeding to the rear end of the bundle chamber as illustrated in Figure 16.

It will be noted that we have illustrated the actual knotter conventionally since we do not claim to have made any invention relative to a knotter per se.

It will be seen that the arm 185 projects outwardly into the passageway H and it is to be understood that the stalks accumulate thereagainst under the influence of a packing arm 186, which rotates in a counterclockwise direction with respect to the accompanying Figure 38, the operation of which will be described in detail hereinafter.

When an accumulation of stalks exerts sufficient pressure against the arm 185, the same yields and in yielding takes with it the inclining rod 187 which as clearly illustrated in the accompanying Figures 38 and 43, is socketed at the location indicated and terminates at the opposite end thereof in the dog 188.

This dog is of the configuration clearly illustrated in the accompanying Figure 41, from which it will be seen that when the same is moved clockwise about the point at which it is pivoted, the pawl 189 is released to operate the clutch collectively enumerated 190 in the accompanying Figure 39.

This clutch is mounted upon the shaft 34 already referred to earlier in this specification, being similar in principle to the clutch 38 and consisting of a dished plate 191 movable with the freely mounted sprocket 32 while keyed to the shaft 34 is a plate 192 having a projecting annular central portion 193 integral therewith, which projects into the center of the member 191.

The pawl 189 is mounted upon the outer surface of the member 192 and is provided with a dog 194 identical in action to the dog 47 described and illustrated in connection with the accompanying Figures 12, 17, 26 and 27, for which reason we will not describe the same again in detail. Such dog moreover, engages with notches in the members 192 and 193 which are also identical in configuration to notches 42 and 43.

Surrounding the shaft 34 and integral with the plate 192, however, is a sleeve 195, to the end of which is secured a bevel pinion 196 in mesh with a pinion 197 mounted upon a vertically disposed stub shaft 198 suitably held in bearings 199 secured to a bracket 200 (Figure 37), and from this it will be apparent that upon operative engagement of the two parts of the clutch 190, the gear 196 must rotate.

Keyed to the shaft 198 is a spur gear 201 in mesh with a spur gear 202 secured to a vertical shaft 203 having a squared center portion 204. The ends of the shaft 203 are journalled in bearings 205 forming part of the vertically movable casting 206, all clearly illustrated in the accompanying Figure 37, from which it will be seen that the casting 206 may be elevated or lowered as by means of the set-screw 207, the purpose of this casting being to provide for the lowering or raising of the knotter so that short stems or long stems may be bound around at the most suitable point.

Keyed to the shaft 203 above the squared portion 204 is a sprocket wheel 208, around which extends a chain 209 engaging with a sprocket wheel 210, keyed to the vertical shaft 211. Upon the upper end of the shaft 211 and keyed thereto is a bevel gear 212 in mesh with a similar bevel gear 213, keyed to an overhead horizontal shaft 214, at the opposite end of which is a similar bevel gear 215, in mesh with a fourth similar bevel gear 216 keyed to the upper end of a shaft 217, which in turn has keyed to it at the location clearly indicated in the accompanying Figure 37, the kickers 186 already referred to, which it will be seen rotate in a clockwise direction when viewed in plan as per the accompanying Figure 38.

To the lower end of the shaft 203 is keyed a disk 218 best illustrated in the accompanying Figure 38 and freely secured eccentrically upon the lower face of the disk is a stud 219, to which in turn is freely connected a crank arm 220.

The opposite end of the crank arm 220 is in turn freely connected to the conventional knotter member 221, which it will be seen, is pivoted at the point 222 in the accompanying Figure 38.

It accordingly follows that upon rotation of the shaft 203 the disk 218 will be rotated to move the member 221 in a counterclockwise direction with respect to the accompanying Figure 38 as clearly indicated and bind the stems held back by the arm 185.

It will be seen by reference to the accompanying Figure 41 that the rod 187 is provided with a spring pawl 223, which engages with a counting ratchet 224, which is caused to rotate by the distance of one tooth for every sheaf which is tied, so that when a number of sheaves corresponding to the number of teeth in the counting ratchet have been tied, the single revolution clutch 38 is brought into operation and by reference to the accompanying Figures 39, 41 and 42, it will be seen that the counting ratchet 224 is keyed to a shaft 225, the same being journalled on the bracket 226 and provided with a right angled end piece 227 which at each revolution is capable of engaging the portion 228 of a vertical, spring held shaft 229 having positioned thereon an outwardly projecting dog 230.

The dog 230 engages the nose 54 of the pawl 48 in exactly the same way as the nose 53 of the clutch releasing arm 52 engages in connection with the accompanying Figure 17 already described in detail, and from the foregoing it will be apparent that normally the member 230 projects to hold the pawl 48 in the position illustrated in the accompanying Figure 42, but that upon the counterclockwise brushing action of the portion 227, the rod 229 and associated projection 230 is lifted, thereby permitting the pawl to rotate under the influence of the spring 50 so that the dog 47 engages and effectuates a single revolution of the associated clutch mechanism as already described in full detail.

From the foregoing it will be apparent that upon sufficient pressure being brought to bear against the projecting arm 185, the member 221 will swing out and return and effectuate a sheaf tying operation in accordance with conventional practice, and that simultaneously the kickers 186 will also rotate through the overhead train of gearing already described in association with the accompanying Figure 37. It is of course to be understood also that the spur gear 202 is free upon the squared portion of the shaft 203 and is simply held thereupon as by means of the bracket 200 at a predetermined level.

It will be understood that the members 185 and 221 best illustrated in plan in the accompanying Figure 38, are both mounted to rotate about the same point, viz. the point 222 and it will be seen that for compactness, the sprocket wheels 32 and 57, are provided with annular recesses 231 to provide for the spur gear 201.

In conclusion we have illustrated in the accompanying Figure 45 a means by which the casting 206 may conveniently be secured to the rotary drive housing 18 so as to be capable of vertical movement therein and from this figure it will be seen that the vertical sides of the casting are of I-section, one flange of which engages with vertical tracks 232 mounted upon the inner side of the rear wall 25 of the drive housing. It should also be noted in this context that the casting 206 may be moved down through a transverse aperture 233 adjacent the rear end 24 of the hood 20 best illustrated in the accompanying Figure 37, for binding short stems.

Since many modifications can be made in the invention herein described and since the accompanying drawings have been prepared only to illustrate the relative arrangement and interaction of parts and not with regard to accuracy of dimensions for manufacturing purposes which in view of this disclosure we consider to entail merely mechanical skill together with the skill of the mechanical draftsman. and since many apparently widely different embodiments of this invention may be made within the scope of the accompanying claims without departing from the spirit and scope of the same it is intended that all matter contained in the accompanying specification shall be interpreted as illustrative only and not in a limiting sense and we desire only such limitations placed thereon as justice dictates.

What we claim as our invention is:

1. A harvester comprising in combination a wheeled framework, a reel, cutter-bar, and conveyor platform in conventional relationship thereon, means for erecting the stems of plants cut by said harvester and accumulating the same into a bundle, means for depositing said bundle in erect position upon the ground, spreading the base thereof prior to making ground contact and means for forming, packing and pressing said bundle into the form of a shock after deposit of said bundle onto the ground.

2. A harvester comprising in combination a wheeled framework, a reel, cutter-bar, and conveyor platform in conventional relationship thereon, means for first erecting and then binding the stems of plants cut by said harvester into sheaves, accumulating said sheaves into a vertical bundle, means for depositing said bundle in erect position onto the ground, spreading the base thereof prior to making ground contact and means for packing said sheaves together above the waists thereof, pressing the butts into the stubble and forming a shock of said sheaves after deposit of said bundle onto the ground.

3. A harvester comprising in combination a wheeled framework, a reel, cutter-bar, and conveyor platform in conventional relationship thereon, bundle forming mechanism, means for depositing said bundle in erect position on the ground, means for spreading the base of said bundle prior to its making ground contact, means for packing the upper parts of the stems forming said bundle together after deposit of said bundle onto the ground, and then pressing the butts thereof into the stubble and forming said bundle into a shock.

4. A shocker comprising in combination bundle forming mechanism, means for depositing said bundle in erect position on the ground, means for spreading the base thereof prior to its making ground contact, means for packing the upper parts of the stems forming the bundle together, after deposit thereof onto the ground, and then pressing the butts thereof into the stubble and forming said bundle into a shock.

5. A harvester comprising in combination upon a wheeled framework, a reaping assembly and a shocking assembly, said reaping assembly consisting of a reel, cutter-bar and conveyor platform in conventional relationship, said shocking assembly including a stem receiver in the form of a longitudinally extending passage, a stem elevator positioned between said reaping assembly and said passage, a stem receiving platform adjacent the top of said elevator and positioned between said elevator and said passage, said stems being deposited into said passage from said platform while lying horizontally, means in said passage for elevating said stems into the vertical, a knotter projecting into said passage for binding said stems into sheaves, a bundle chamber at the rear of said passage and a shock forming mechanism also at the rear of said passage.

6. A harvester comprising in combination upon a wheeled framework, a reaping assembly and a shocking assembly, said reaping assembly consisting of a reel, cutter-bar and conveyor platform in conventional relationship, said shocking assembly consisting of a longitudinally extending passage positioned at one side of said reaping assembly, means therein for conveying stems along said passage, shock forming means at the rear end of said passage, a reaping assembly drive gear disposed at the forward end of said passage, a pitman gear wheel in mesh with said drive gear, a pitman shaft connected thereto, said shaft being connected at the opposite end thereof to said cutter-bar, a reel drive counter-shaft rotatably connected to said drive gear assembly and to said reel, a stem elevator between said reaping assembly and said shocking assembly, a receiving platform extending between the top of said stem elevator and said passage and means extending between said drive gear assembly and said elevator for operating the latter.

7. In a shocker a pair of horizontally disposed, spaced and parallel rotors, the longitudinal axes of said rotors lying parallel with the direction of travel, a spiral shock shaper extending around each rotor and means for rotating the right hand rotor in a counterclockwise direction and the left hand rotor in a clockwise direction when viewed from the front of said shocker.

8. In a shocker a horizontally disposed rotor having its longitudinal axis parallel with the direction of travel, a spiral shock shaper extending around said rotor, a packer adjacent said rotor and a removable, shallow, wedge-shaped platform below and to one side of said rotor.

9. In a shocker a pair of horizontally disposed, parallel and spaced rotors having their longitudinal axes parallel with the direction of travel, a packer positioned between said rotors and a removable, shallow, wedge-shaped platform below and between said rotors.

10. A shocker comprising in combination a framework, a longitudinally extending passage designed to receive the stems of harvested plants from an adjacent reaper in horizontal position, means for conveying said stems rearwardly along said passage, means for erecting said stems into the vertical and forming the same into bundles, a pair of horizontally disposed and spaced, rotors immediately beyond the rear of said passage, and on each side of said rear end, a spiral shaper extending around each rotor, the left hand rotor being designed to rotate clockwise and the right hand rotor counterclockwise when viewed from the front of said shocker, a yieldable packer positioned between said rotors and a removable platform between and below said rotors.

DONALD MacLEAN.
JAMES E. ELDRIDGE.
PHILLIP CRAVITS, Jr.